INVENTOR
WILLEM JACOBUS VAN DE LINDT
BY
AGENT

Patented July 14, 1953

2,645,758

UNITED STATES PATENT OFFICE 2,645,758

ELECTROMAGNETIC DEVICE FOR AMPLITUDE - MODULATION OF HIGH - FREQUENCY OSCILLATIONS

Willem Jacobus van de Lindt, Eindhoven, Netherlands, assignor to Hartford National Bank and Trust Company, Hartford, Conn., as trustee Application April 14, 1951, Serial No. 221,024
In the Netherlands April 20, 1950

6 Claims. (Cl. 332—54)

This invention relates to an electromagnetic device for producing amplitude-modulation of a high-frequency oscillation having a frequency of, for example, more than 100 mcs./sec. In particular the invention relates to a device of the foregoing type employing a body of premagnetized substantially non-conductive ferromagnetic material which produces a variable damping of the high-frequency oscillation when excited by a modulating field. The term "amplitude modulation" is herein defined as including the control of amplitude of a wave as a function of a control quantity.

A device has previously been suggested in which a body of substantially non-conductive, ferromagnetic material, for example, a ferrite (chemical formula $Me(Fe_2O_4)_n$ where Me designates a metal or a combination of metals in which the sum of the valencies $=2n$) is employed which is polarized by the action of a modulating field at right angles to the magnetic field strength of the high-frequency oscillation in a manner such that the precession frequency (Larmor frequency) of the electrons of the ferromagnetic medium providing the magnetic properties, which frequency corresponds to said modulating and polarizing magnetic field, approximately coincides with the frequency of the high-frequency oscillation.

A device of the foregoing type has some important limitations. Thus, the polarizing field appears to require a constant component which saturates the ferromagnetic material to a large extent in order to dominate the disturbing effects of the anisotropic fields occurring within the material. The value of this constant component of the field is furthermore proportional to the frequency of the high-frequency oscillation, so that for frequencies of, for example, more than 100 mcs./sec. a constant component of several thousands of amps./cm. is required. To produce such a field a large amount of direct-current energy or a strong permanent magnet is required. Furthermore, it appears that modulation of the polarizing field not only results in a variation of the damping, i. e. of the imaginary permeability of the medium, but also in a material variation of the real permeability, so that, by placing the ferromagnetic medium, for example, in a cavity resonator excited by the high-frequency oscillation, the cavity resonator is materially detuned upon said modulation, so that the high-frequency oscillation is modulated not only in amplitude but also in a phase.

According to the invention, the ferromagnetic material employed for this purpose is required to exhibit a specific resistance, measured at the frequency of the high-frequency oscillation, of more than 10 Ω cm. and furthermore the material should have a preferential direction of the partitions (Bloch partitions) between the Weiss domains created by internal anisotropy of shape. Moreover, the direction of the magnetic field vector of the high-frequency oscillation forms an angle with this preferential direction. In addition, the pre-magnetizing field strength is such that the value of the saturation field strength of the ferromagnetic material is not exceeded so that its real permeability at the stated frequency generally varies slightly.

The invention is based on the discovery of the surprising effect that certain types of ferrite which are produced in a particular manner when arranged in a cavity resonator excited by a high-frequency oscillation, exhibit an appreciable reduction in the damping of the cavity resonator with very slight pre-magnetisation. In general ferrites and their manner of preparation have been been fully described in U. S. Patents 2,452,529, 2,452,530 and 2,452,531 and U. S. application Ser. Number 732,836, filed March 6, 1947, by J. L. Snoek et al., now U. S. Patent 2,579,978, issued December 25, 1951.

This effect appears to occur only with substantially non-conductive ferromagnetic materials having a specific resistance, measured at the high-frequencies concerned, exceeding 10 Ω cm. The reason for this effect appears to be due to the fact that in conductive, ferromagnetic material the surface currents (skin effect) prevent a high frequency alternating field from penetrating into the interior of the material, whereas in non-conductive ferrites the interior of the medium is also capable of exerting its influence upon the high-frequency alternating field since there are virtually no surface currents due to the poor conductivity of the latter materials. Thus, for example, Mn—Zn ferrites having a large ferrous iron content, and having a specific resistance measured at high-frequency of about 0.1 Ω cm., do not appear to have this effect. However, this specific resistance strongly increases as the ferrous iron content of the material is decreased. The latter may be controlled during the process of manufacture of such ferrites by controlling the composition of the atmosphere in which the ferrite is manufactured.

Furthermore, it has been found that this effect occurs only at very high frequencies, viz. higher than the natural gyromagnetic resonance frequency of the ferromagnetic material, i. e. the precession frequency of the electrons of the material determining the magnetic properties, under the action of magnetic fields produced by anisotropies in the Weiss domains of the material. The term "Weiss domain" is to be understood, as usual, to mean the largest ranges present in the medium, having a magnetisation substantially constant in size and direction. The Weiss ranges are relatively separated by very thin Bloch partitions within which the magnetisation is subject to great variation.

Only those types of ferrites show the effect, which are manufactured by extrusion or, in general, those which exhibit a preferential direction of the partitions between the Weiss domains resulting from internal anisotropy of shape. This may be explained in that the preferential direction which the Bloch partitions exhibit as a result of extruding the body, appears to result in the ferrite showing an increase in damping at a high frequency of the alternating current field at right angles to this preferential direction, the Bloch partitions disappearing if the ferrite is pre-magnetized. It has been found from measurements that only a small pre-magnetizing field of several amps./cm. is required to vary the losses brought about by the ferrite, for example by a factor 10:1, so that in practice variation in amplitude (modulation depth) of the high-frequency oscillation is rendered possible, the tuning frequency of the cavity resonator then generally remaining substantially constant. The frequency of the pre-magnetizing field may be increased to several mcs./sec.

The invention will now be explained more fully with reference to the drawing in which, Fig. 1 shows a side view of the device;

Figure 1:
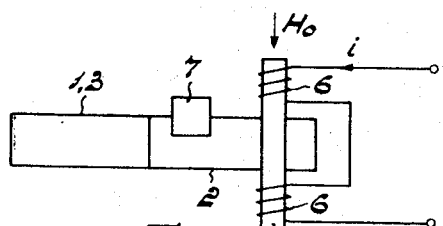

An electro-magnetic oscillation $E_I$ is supplied through an input wave channel to a resonator 2, the circuit quality of which is varied with a modulating oscillation, so that a modulated oscillation $E_0$ is produced in output wave channel 3. A ferrite rod 5, which is subject to the action of a modulating current $i$, which traverses a premagnetizing winding 6 surrounding the rod 5 is coupled to the cavity resonator. The oscillation produced in the cavity resonator 2 is such that the high-frequency magnetic field H is at right angles to the rod axis. A knob 7 enables it to be accurately tuned to the frequency of the oscillation $E_r$.

According to the invention, the rod 5 is made of ferrite of the substantially non-conductive type, i. e. a ferrite having a specific resistance, measured at the stated high-frequencies, higher than 10Ω cm. It is, for example, made of Ni—Zn ferrite having a low ferrous iron content, the specific resistances measured at high-frequency being about $10^5$ Ω cm.

It is furthermore necessary that the rod exhibit a preferential direction of the Bloch partitions produced by internal anistropy of shape and for this purpose it may, for example be made by the extrusion method in a known manner. The following, as it appears, is responsible for this requirement.

Figures 3, 4:
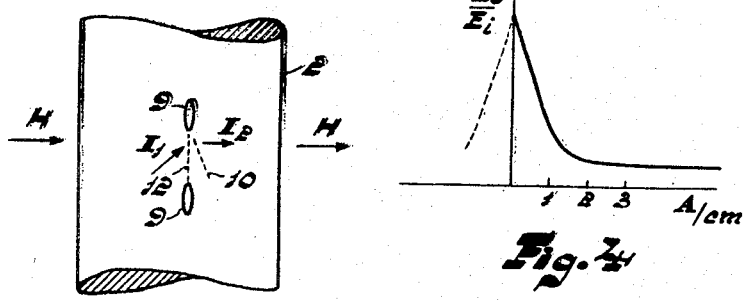
Fig. 3 shows pictorially the action of the magnetic fields in a portion of the device.
Fig. 4 shows a modulation characteristic curve of the device.

A rod manufactured by extrusion exhibits, as shown in Fig. 3, a considerable number of very small occlusions 9 occupied by a non-ferromagnetic phase, for example, air (for the sake of clarity the figure only shows two such occlusions on a greatly exaggerated scale), all of which will be elongated in the direction of the axis of the rod. The ferromagnetic material i. e. the material enclosing the occlusions 9, has an internal geometry which, viewed in the direction of the axis of the rod, distinctly differs from the geometry viewed at right angles to this axis, i. e. it has an anisotropy, geometric shape.

The Bloch partitions between neighbouring Weiss domains of the ferromagnetic material, which, in the absence of the occlusions 9, would have adjusted themselves according to the bisector plane 10 of the directions $I_1$ and $I_2$ of the spontaneous magnetisation in these Weiss domains, will now rather tend to form the shortest connections 12 between neighbouring occlusions 9 and thus exhibit a preferential direction coinciding with the axis of the rod, in which event, however, magnetic charges are produced along this partition.

It is plausible that a high-frequency alternating field H, which invariably tends to displace the Bloch partitions to such an extent that Weiss domains in which the magnetisation I has the direction of the magnetic field strength H, increase at the expense of Weiss ranges in which such is not the case, will have to supply an appreciably greater quantity of energy for displacing said partitions against the action of the magnetic charges, than if the occlusions 9 were absent or at least not elongated to such an extent.

Because of a premagnetizing field $H_0$, which is produced by the current $i$ flowing through the windings 6, the various Weiss domains with a direction of the spontaneous magnetization I corresponding to the field $H_0$ will steadily grow, the Bloch partitions between the Weiss domains finally disappearing completely at the saturation field strength.

Consequently, in this case, the source of losses for the high-frequency alternating field H is rendered ineffective, the cavity resonator 2 having a high circuit quality and hence a high impedance, which results in the reflection of a great portion $E_r$ of the incoming oscillation $E_i$. Accordingly, it is found, as shown in Fig. 4, that the amplitude of the high-frequency oscillation $E_0$ has dropped considerably, for example, within a few amps./cm. By providing a tuning piston in wave guide 3 it may be ensured that the amplitude of the resulting oscillations, reflected by the cavity resonator and the piston is zero at a given value of the premagnetizing field $H_0$, for example at a few amps./cm., the amplitude having its maximum value if the field $H_0=0$. With small fields $H_0$, the variation in the virtual permeability of the rod for high-frequency is in most cases so small that troublesome phase modulation of the high-frequency modulation does not occur.

Variation of the premagnetizing field $H_0$ thus results in modulation of the output oscillation $E_0$ in accordance with the modulation characteristic curve shown in Fig. 4. This curve is substantially straight through a great part, so that the process of modulating introduces only slight distortion, while furthermore the modulating field $H_0$ may be raised to frequencies of the order of some mcs./sec. without the amplitude of the modulated oscillation varying to any appreciable extent with the frequency of the modulating oscillation. If the direction of the premagnetizing field $H_0$ is reversed, a similar characteristic curve is found (shown by dotted line in Fig. 4).

The required premagnetizing field is, of course, reduced if the ferrite rod is made longer, since in this case the demagnetizing action of the end surfaces of the rod decreases. Finally, the premagnetizing circuit may be realised with a closed ferro-magnetic circuit.

Below are some examples of the manufacture of a ferro-magnetic medium for the device according to the invention, together with the measuring results obtained with such devices.

*Example I*

A mixture consisting of 75 gs. (1 mol.) of nickel oxide and 160 gs. (1 mol.) of ferri-oxide, after alcohol being added, is ground in a ball mill for 16 hours. After filtration and drying at 110° C. the mixture is heated at 1000° C. for 2 hours, then after addition of alcohol is ground again in the ball mill for 16 hours and subsequently filtered and dried.

10 gs. of this mixture, together with 2 ccs. of water and 300 mgs. of "Electrocol" (a partly hydrolised potato-starch product of Messrs. Scholten at Groningen) are treated in a mortar for 15 minutes and subsequently kneaded by hand for 5 minutes, if desired whilst adding some further drops of water, to form an easily kneadable mass. The mass is extruded in an extrusion mould to form a rod of 1.57 mms. in diameter, from which a D-shaped ring is formed by hand, having a straight piece of about 40 mms. The ring is dried in air and subsequently heated at 1230° C. in an atmosphere of oxygen for 2 hours.

The measurements carried out on this ring yielded the following results:

(The term half-value width is to be understood to mean the width of the resonance characteristic curve of the cavity resonator where the impedance has decreased to half the maximum value.)

Working frequency, 9260 mcs./sec.
Initial permeability, 17.
Specific resistance at working frequency, $10^5$ ohms/cm.
Gyromatic resonance frequency=130 mcs./sec.
Cavity resonator box-shaped, diameter 56 mms., height 15 mms.
Oscillation curve $E_{020}$.
Half-value width cavity resonator without rod, 6 mcs./sec.
Contribution half-value width by rod at $H_0=0$, 8.7 mcs./sec.
Contribution half-value width by rod at $H_0=4$ amps./cm., 3 mcs./sec.
Detuning cavity resonator at $H_0=0$, −12 mcs./sec.
Detuning cavity resonator at $H_0=4$ amps./cm., −11 mcs./sec.

*Example II*

A mixture consisting of 750 gs. (10 mol.) of nickel oxide, 810 gs. (10 mol.) of zinc oxide and 3200 gs. (20 mol.) of ferri-oxide, after water being added, is ground in a ball mill for 16 hours. After filtration and drying at 110° C., the mixture is heated at 1000° C. for 2 hours and subsequently, after addition of water, ground in the ball mill for 16 hours, filtered and then dried.

A quantity of 10 gs. of this mixture is treated in the manner stated in Example I, to form a plastic mass, from which a rod of 1.62 mms. in diameter and 104 mms. of length is extruded and heated at 1230° C., in air for 2 hours.

The results of measurement carried out in this rod were as follows:

Working frequency=9300 mcs./sec.
Initial permeability, $\mu_0=230$.
Specific resistance at working frequency, $10^5$ ohms/cm.
Gyromagnetic resonance frequency=15 mcs./sec.
Cavity resonator box-like, diameter 56 mms., height 15 mms.
Oscillation curve $E_{020}$.
Half-value width cavity resonator without rod= 6 mcs./sec.
Contribution half-value width by rod at $H_0=0$, 22.6 mcs./sec.
Contribution half-value width by rod at $H_0=4$ amps./cm., 9.4 mcs./sec.
Detuning cavity resonator at $H_0=0$, −2 mcs./sec.
Detuning cavity resonator at $H_0=4$ amps./cm., 6 mcs./sec.

*Example III*

A mixture consisting of 60.4 gs. of raw manganese carbonate (corresponding to 0.5 mol. of MnO) and 80.1 gs. (0.5 mol) of ferri-oxide, after alcohol being added, is ground in a ball mill for 8 hours, subsequently dried and then heated at 950° C. in air for 2 hours. After addition of alcohol, the grinding process in the ball mill is continued for 4 hours, followed by drying at 110° C.

10 gs. of this mixture are treated in the manner indicated in Example I, to form a plastic mass, from which a rod of 2.2 mms. in diameter and 40 mms. of length is manufactured by the extrusion process. The rod is dried in air, slowly heated to 300° C. and then evenly heated to 1250° C. and heated at this temperature in an atmosphere of substantially pure nitrogen for 2 hours.

Measurements carried out on this rod yielded the following results:

Working frequency, 9350 mcs./sec.
Initial permeability, $\mu_0=130$.
Specific resistance at working frequency=$3.10^4$ ohms/cm.
Gyromagnetic resonance frequency=8 mcs./sec.
Cavity resonator box-like, diameter 56 mms., height 15 mms.
Oscillation curve $E_{020}$.
Half-value width cavity resonator without rod= 6 mcs./sec.
Contribution half value width by rod at $H_0=0$, 43 mcs./sec.
Contribution half value width by rod at $H_0=30$ amps./cm., 15 mcs./sec.
Detuning cavity resonator at $H_0=0$, 7 mcs./sec.
Detuning cavity resonator at $H_0=30$ amps./cm., 70 mcs./sec.

Similar measurements carried out in a cavity resonator for a working frequency=3100 mcs./sec. with correspondingly thicker rods showed an approximately equal variation and the half-value width of the cavity resonator and a detuning about 5 times smaller. Similar results were found at a working frequency of 310 mcs./sec.; at a working frequency=22,000 mcs./sec., the variation in half-value width and hence of the circuit quality with the premagnetizing field started to decrease.

Figure 2:
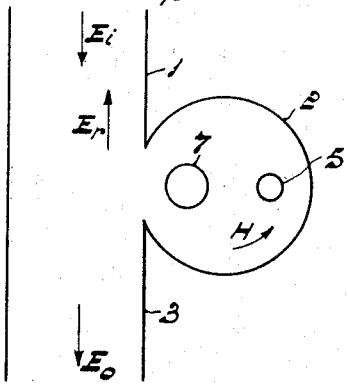
Fig. 2 shows a plan view of the same device according to the invention.

The embodiment shown in Fig. 2 only serves as an example of a device according to the invention. The cavity resonator may alternatively be realized in numerous other ways.

While the invention has thus been described with specific examples and embodiments, other variations thereof will be readily apparent to those skilled in the art without departing from the spirit and scope of the invention.

What I claim is:

1. A device for amplitude modulating a cyclically recurring wave, comprising a body of substantially non-conductive ferromagnetic material, means to generate a wave of given frequency, higher than the natural gyromagnetic resonance frequency of said ferromagnetic material, means to couple said wave generating means to said body, said body having a specific resistance exceeding 10 ohms/cm. at said given frequency, and having a given preferential direction of Bloch partitions produced by internal anisotropy of shape said preferential direction forming an angle with the magnetic field vector of the wave, and means to premagnetize said body below a field strength of the order of magnitude of the saturation field strength of the ferromagnetic material.

2. A device for amplitude modulating a cyclically recurring wave, comprising a body of substantially non-conductive, ferromagnetic material, means to generate a wave of given frequency higher than the natural gyromagnetic resonance frequency of said ferromagnetic material, means to couple said wave generating means to said body, said body having a specific resistance exceeding 10 ohms/cm. at said given frequency, and having a given preferential direction of Bloch partitions produced by internal anisotropy of shape substantially perpendicular to the magnetic field vector of the wave, and means to premagnetize said body below a field strength of the order of magnitude of the saturation field strength of the ferromagnetic material.

3. A device for amplitude modulating a cyclically recurring wave, comprising a substantially rod-like body of substantially non-conductive, ferromagnetic material, means to generate a wave of given frequency higher than the natural gyromagnetic resonance frequency of said ferromagnetic material, means to couple said wave generating means to said body, said body having a specific resistance exceeding 10 ohms/cm. at said given frequency, said body having a given preferential direction of Bloch partitions produced by internal anisotropy of shape substantially coincident with the longitudinal axis of said body and forming an angle with the magnetic field vector of the wave, and means to premagnetize said body below a field strength of the order of magnitude of the saturation field strength of the ferromagnetic material.

4. A device for amplitude modulating a cyclically recurring wave, comprising a tubular body of substantially non-conductive, ferromagnetic material having a given axis means to generate a wave of given frequency higher than the natural gyromagnetic resonance frequency of said ferromagnetic material means to couple said wave generating means to said body, said body having a specific resistance exceeding 10 ohms/cm. at said given frequency and a given preferential direction of Bloch partitions produced by internal anisotropy of shape said preferential direction being substantially coincident with said axis of said body and forming an angle with the magnetic field vector of the wave, and means to premagnetize said body below a field strength of the order of magnitude of the saturation field strength of the ferromagnetic material.

5. A device for amplitude modulating a cyclically recurring wave, comprising a substantially cylindrical body of substantially non-conductive, ferromagnetic material, means to generate a wave of given frequency higher than the natural gyromagnetic resonance of said ferromagnetic material, means to couple said wave generating means to said substantially cylindrical body, said body having a specific resistance exceeding 10 ohms/cm. at said given frequency, said body having a given preferential direction of Bloch partitions produced by internal anisotropy of shape substantially coincident with the axis of said body and forming an angle with the magnetic field vector of the wave, and means to premagnetize said body along said axis of the body below a field strength of the order of magnitude of the saturation field strength of the ferromagnetic material.

6. A device for amplitude modulating a cyclically recurring wave, comprising a substantially rod-like body of substantially non-conductive, ferromagnetic material, means to generate a wave of given frequency higher than the natural gyromagnetic resonance frequency of said ferromagnetic material, a resonant cavity excited by said wave generating means, means to couple said body to said resonant cavity said body having a specific resistance exceeding 10 ohms/cm. at said frequency and having a given preferential direction of Bloch partitions produced by internal anistropy of shape substantially coincident with the axis of said body and forming an angle with the magnetic field vector of the wave, and means to premagnetize said body along the axis thereof below a field strength of the order of magnitude of the saturation field strength of the ferromagnetic material.

WILLEM JACOBUS van de LINDT.

References Cited in the file of this patent

UNITED STATES PATENTS

| Number | Name | Date |
|---|---|---|
| 2,174,701 | Koch | Oct. 3, 1939 |
| 2,217,280 | Koch | Oct. 8, 1940 |
| 2,560,859 | Gutton et al. | July 17, 1951 |